US008506404B2

(12) United States Patent
Distanik et al.

(10) Patent No.: US 8,506,404 B2
(45) Date of Patent: Aug. 13, 2013

(54) WIRELESS GAMING METHOD AND WIRELESS GAMING-ENABLED MOBILE TERMINAL

(75) Inventors: Israel Distanik, Bat-Hefer (IL); Eli Ben-Ami, Herzlia (IL); Yael Dror, Ramat-Gan (IL); Kim Michael Lee, Herzlia (IL); Asaf Barzilay, Tel-Aviv (IL); Eyal Sadeh, Herzlia (IL); Amir Primov, Herzlia (IL); Nitsan Goren, RaAnana (IL); Natan Linder, Motza Illit (IL); Ehud Lavski, Herzlia (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1863 days.

(21) Appl. No.: 11/797,731

(22) Filed: May 7, 2007

(65) Prior Publication Data

US 2008/0280676 A1 Nov. 13, 2008

(51) Int. Cl.
*A63F 13/12* (2006.01)
*A63F 13/10* (2006.01)
*A63F 13/00* (2006.01)

(52) U.S. Cl.
USPC ................... 463/42; 463/36; 463/37; 463/40; 463/41

(58) Field of Classification Search
USPC .......................................... 463/36, 37, 40–42
See application file for complete search history.

(56) References Cited

U.S. PATENT DOCUMENTS 6,176,837 B1 * 1/2001 Foxlin ........................... 600/595
6,445,364 B2 * 9/2002 Zwern ............................... 345/8
6,604,049 B2 * 8/2003 Yokota .......................... 701/484
6,757,068 B2 * 6/2004 Foxlin ........................... 356/620
6,893,347 B1 * 5/2005 Zilliacus et al. ................ 463/41
6,972,734 B1 * 12/2005 Ohshima et al. .................. 345/8
7,435,177 B1 * 10/2008 Ford ................................ 463/30
7,564,469 B2 * 7/2009 Cohen ........................... 345/632
7,628,074 B2 * 12/2009 Vannucci et al. ............... 73/597
7,709,725 B2 * 5/2010 Toledano et al. ............... 84/615
7,716,008 B2 * 5/2010 Ohta ............................. 702/152
7,803,050 B2 * 9/2010 Mao et al. ....................... 463/36
7,850,526 B2 * 12/2010 Zalewski et al. ................ 463/36
7,918,733 B2 * 4/2011 Zalewski et al. ................ 463/39
7,946,921 B2 * 5/2011 Ofek et al. ....................... 463/37
7,991,401 B2 * 8/2011 Linder et al. .................. 455/438
8,044,289 B2 * 10/2011 Toledano et al. ............... 84/600

(Continued)

OTHER PUBLICATIONS

Foxlin et al. "WearTrack: A Self-Referenced Head and Hand Tracker for Wearable Computers and Portable VR." Proceedings of International Symposium of Wearable Computers (ISWC 2000). Oct. 16-18, 2000. 8 p.*

(Continued)

*Primary Examiner* — William H McCulloch, Jr.

(57) ABSTRACT

A wireless gaming method and wireless gaming-enabled mobile terminal are provided for enabling a number of players to participate simultaneously in a game using their mobile terminals. A wireless gaming method of the present invention includes inviting, if a multi-player gaming mode for a game is activated, at least one counterpart terminal on a short range wireless communication network by transmitting a multi-player gaming mode request message; synchronizing, if an acknowledge message is received in response to the multi-player gaming mode request message, game data with the counterpart terminal transmitted the acknowledge message; and generating a game screen with an image taken by the camera as a background image after the game is synchronized; and starting the game with the game screen.

24 Claims, 10 Drawing Sheets

(56) References Cited

U.S. PATENT DOCUMENTS

| | | | | |
|---|---|---|---|---|
| 8,130,242 | B2 * | 3/2012 | Cohen | 345/632 |
| 8,303,405 | B2 * | 11/2012 | Zalewski et al. | 463/30 |
| 8,308,563 | B2 * | 11/2012 | Ikeda et al. | 463/37 |
| 8,313,380 | B2 * | 11/2012 | Zalewski et al. | 463/39 |
| 8,384,665 | B1 * | 2/2013 | Powers et al. | 345/156 |
| 2002/0006826 | A1 * | 1/2002 | Hansted | 463/42 |
| 2002/0024675 | A1 * | 2/2002 | Foxlin | 356/620 |
| 2002/0090985 | A1 * | 7/2002 | Tochner et al. | 463/1 |
| 2003/0064712 | A1 * | 4/2003 | Gaston et al. | 455/414 |
| 2003/0125112 | A1 * | 7/2003 | Silvester | 463/42 |
| 2003/0220145 | A1 * | 11/2003 | Erickson et al. | 463/47 |
| 2004/0152517 | A1 * | 8/2004 | Hardisty et al. | 463/42 |
| 2004/0201857 | A1 * | 10/2004 | Foxlin | 356/620 |
| 2005/0197189 | A1 * | 9/2005 | Schultz | 463/42 |
| 2006/0079330 | A1 * | 4/2006 | Dvorak et al. | 463/42 |
| 2006/0130636 | A1 * | 6/2006 | Toledano et al. | 84/600 |
| 2006/0135258 | A1 * | 6/2006 | Maheshwari et al. | 463/42 |
| 2006/0154710 | A1 * | 7/2006 | Serafat | 463/1 |
| 2006/0223635 | A1 * | 10/2006 | Rosenberg | 463/37 |
| 2006/0256081 | A1 * | 11/2006 | Zalewski et al. | 345/156 |
| 2006/0287084 | A1 * | 12/2006 | Mao et al. | 463/37 |
| 2007/0060354 | A1 * | 3/2007 | Theimer et al. | 463/40 |
| 2007/0063032 | A1 * | 3/2007 | Silverbrook et al. | 235/432 |
| 2007/0063039 | A1 * | 3/2007 | Silverbrook et al. | 235/432 |
| 2007/0097127 | A1 * | 5/2007 | Seo et al. | 345/473 |
| 2007/0259716 | A1 * | 11/2007 | Mattice et al. | 463/36 |
| 2007/0265089 | A1 * | 11/2007 | Robarts et al. | 463/42 |
| 2007/0281791 | A1 * | 12/2007 | Ichikawa et al. | 463/42 |
| 2007/0294250 | A1 * | 12/2007 | Linder et al. | 707/6 |
| 2008/0039124 | A1 * | 2/2008 | Linder et al. | 455/466 |
| 2008/0146343 | A1 * | 6/2008 | Sullivan et al. | 463/42 |
| 2008/0223131 | A1 * | 9/2008 | Vannucci et al. | 73/510 |
| 2008/0280676 | A1 * | 11/2008 | Distanik et al. | 463/29 |
| 2009/0037526 | A1 * | 2/2009 | Elliott et al. | 709/203 |
| 2009/0208062 | A1 * | 8/2009 | Sorek et al. | 382/107 |
| 2009/0209343 | A1 * | 8/2009 | Foxlin et al. | 463/36 |
| 2009/0289900 | A1 * | 11/2009 | Lavski et al. | 345/173 |
| 2009/0293705 | A1 * | 12/2009 | Vered et al. | 84/609 |
| 2010/0178973 | A1 * | 7/2010 | Snoddy et al. | 463/19 |
| 2010/0218664 | A1 * | 9/2010 | Toledano et al. | 84/615 |
| 2011/0216002 | A1 * | 9/2011 | Weising et al. | 345/158 |
| 2011/0304647 | A1 * | 12/2011 | Noge | 345/633 |
| 2012/0086725 | A1 * | 4/2012 | Joseph et al. | 345/629 |
| 2012/0194644 | A1 * | 8/2012 | Newcombe et al. | 348/46 |
| 2012/0200491 | A1 * | 8/2012 | Miller, IV | 345/156 |

OTHER PUBLICATIONS

"Virtual Reality Software & Technology." Proceedings of the VRST '94 Conference. Aug. 23-26, 1994. pp. 159-173.*

Wormell, et al. "Advanced Inertial-Optical Tracking System for Wide Area Mixed and Augmented Reality Systems." Published 2007. 4 p.*

* cited by examiner

WIRELESS GAMING METHOD AND WIRELESS GAMING-ENABLED MOBILE TERMINAL

FIELD OF THE INVENTION

The present invention relates to a mobile terminal and, in particular, to a wireless gaming method and wireless gaming-enabled mobile terminal for enabling a number of players to participate simultaneously in a game using their mobile terminals wirelessly networked on an ad hoc basis.

BACKGROUND OF THE INVENTION

With the technical convergence of different media forms, recent mobile terminals are equipped with various additional functions that offer graphics, audios, videos, and games of higher quality. Especially, a mobile game market is increasing together with widespread mobile phones supporting mobile games.

However, most mobile games are limited for single player mobile games since a multi-player mobile game requires expensive wireless communication cost. Although some card and sports games allow playing against others, such mobile games do not satisfy the players, who are familiar with network games on personal computer networks since the counterparty players are virtual characters.

Also, the conventional mobile games use stereotyped graphical backgrounds configured for corresponding menus or stages of the games, thereby making the player feel bored.

SUMMARY OF THE INVENTION

The present invention has been made in an effort to solve the above problems, and it is an object of the present invention to provide a wireless gaming method and system that are capable of configuring background of a game with images designated by a user.

It is another object of some embodiments of the present invention to provide a wireless gaming method and system that enable multiple players to participate simultaneously in a mobile game without additional communication cost.

In accordance with some embodiments of the present invention, the above and other objects are accomplished by a wireless gaming method for a mobile terminal having a camera. The wireless gaming method includes inviting, if a multi-player gaming mode for a game is activated, at least one counterpart terminal on a short range wireless communication network by transmitting a multi-player gaming mode request message; synchronizing, if an acknowledge message is received in response to the multi-player gaming mode request message, game data with the counterpart terminal transmitting the acknowledge message; and generating a game screen with an image taken by the camera as a background image after the game is synchronized; and starting the game with the game screen.

In accordance with another aspect of some embodiments of the present invention, the wireless mobile gaming method provides displaying game data, e.g. game data in the form of game graphics, superimposed on a game screen background, where the game screen background is a stream of images, e.g. a video stream of images, captured in real time by a camera of the mobile terminal.

In accordance with other embodiments of the present invention, the wireless mobile gaming method provides camera motion tracking on the basis of the real time images captured by the camera unit. A player may shift the field of view of the game screen by changing the view of the camera, for example by physically moving and/or tilting the camera and/or the mobile terminal including a camera.

In accordance with yet another aspect of the present invention, the wireless mobile gaming method provides a game screen that extends over an area that is larger than a field of view of the display of the mobile terminal and a player may displace the camera and/or change the camera view to navigate through the limits of the game screen.

In accordance with some embodiments of the present invention, the wireless mobile gaming method provides synchronizing between the game graphics and the real time background images to provide location persistency. When a player navigates away from a specific field of view of the game screen including game graphics and then later returns to that field of view, the relative location of the game graphics with respect to the field of view of the background image may be substantially maintained.

In accordance with other embodiments of the present invention, the wireless mobile gaming method provides synchronizing between the game graphics and the real time background images to provide object persistency. When a player navigates away from a specific field of view of the game screen including game graphics and then later returns to that field of view, the relative location of the game graphics with respect to objects in the background image may be substantially maintained.

In accordance with yet another embodiment of the present invention, the wireless mobile gaming method, in multi-player mode provides synchronizing between the real time background images, e.g. the video data output. In one example, multi-players may share common game graphic displayed over a common background image. The synchronization between multi-players may be based on location persistency and/or object persistency.

In accordance with some embodiments of the present invention, the above and other objects are accomplished by a wireless gaming-enabled mobile terminal. The wireless gaming-enabled mobile terminal includes a camera unit for taking an image; a video processing unit for processing the image; a sound unit for generating sounds during play; a input unit for receiving a user input; a control unit for generating a game screen by combining a video data output from the video processing unit and graphic data of a game; a display unit for displaying the game screen; a navigation unit to perform motion tracking on the basis of the image taken by the camera unit and provide location and/or object persistency; a short range wireless communication unit for establishing a game network with at least one other terminal in a multi-player gaming mode; and a storage unit for storing game data including the graphic data.

In accordance with other embodiments of the present invention, the wireless gaming-enabled mobile terminal may include one or more gyroscope units, for motion tracking to achieve location and/or object persistency between the game graphics and the real time video image. One or more gyroscope units may facilitate detecting and/or measuring translation and/or rotation of the mobile terminal and may be implemented for motion tracking.

In accordance with another embodiment of the present invention, one or more gyroscope units may facilitate synchronization of video background imagery between multi-players.

It is another object of the present invention to provide a wireless mobile method and system including a camera that enables multiple users to share data synchronized and/or linked with real time images captured by a mobile terminal of the mobile system. In one example a user may send data to a receiving user, e.g. graphic data, linked to a specific location and/or object recognized in a video stream. The receiving user may pan an area to locate the specific location and/or object in a video stream to which the data is linked. Upon arriving at the relevant location the data may be displayed. Synchronization between users may be based on camera motion tracking and/or other motion tracking, and image and/or object recognition. The storage unit of each player may store an initial orientation or other positioning information, e.g. a shared landmark they both see, between each of the cameras In accordance with another aspect of the present invention, the above and other objects are accomplished by a wireless mobile terminal. The wireless mobile terminal includes a camera unit for taking an image; a video processing unit for processing the image; a input unit for receiving a user input; a control unit for generating a game screen by combining a video data output from the video processing unit and graphic data; a display unit for displaying the game screen; a navigation unit to perform motion tracking on the basis of the image taken by the camera unit and provide location and/or object persistency; a short range wireless communication unit for transmitting data to at least one other terminal; and a storage unit for storing data including the graphic data. In another example, the wireless mobile device may include one or more gyroscope devices to enable synchronization between the graphic data and the real time video images as well as between the orientation and position of the different users.

According to an embodiment of the present invention there is provided a wireless gaming method for a mobile terminal having a camera, comprising:

inviting at least one counterpart terminal on a short range wireless communication network by transmitting a multi-player gaming mode request message, when a multi-player gaming mode for a game is activated;

synchronizing game data with the counterpart terminal transmitting the acknowledge message, when an acknowledge message is received in response to the multi-player gaming mode request message;

generating a game screen with an real image taken by the camera as a background image after the game is synchronized; and starting the game with the generated game screen.

There is also provided in accordance with an embodiment of the invention wireless gaming method, wherein the inviting comprises:

discovering terminals on the short range wireless communication network;

listing at least one discovered terminal on a display; and transmitting the multi-player gaming mode request message to the counterpart terminal, when a terminal is selected as the counterpart terminal by a key input.

There is also provided the wireless gaming method wherein the short range wireless communication network is an ad hoc network.

There is also provided the wireless gaming method, wherein the synchronizing comprises:

checking a round trip time to the counterpart terminal;

transmitting game parameters to the counterpart terminal on the basis of the round trip time; and transmitting a game start signal to the counterpart terminal for starting the game in a predetermined time.

There is also provided the wireless gaming method, wherein the predetermined time is ½ of the round trip time.

There is also provided the wireless gaming method wherein the generating comprises:

converting the image input from the camera into video data; and synthesizing the video data and graphic data of the game data to generate the game screen.

There is also provided the wireless gaming method further comprising exchanging the game data, generated during the game, with the counterpart terminal in real time before the game ends.

There is also provided the wireless gaming method, further comprising performing a motion tracking on the basis of the image taken by the camera for matching a movement of graphic data with the background image.

There is also provided the wireless gaming method, wherein further comprising processing simultaneous operations of a same play in the terminals, using a random algorithm.

There is also provided the wireless gaming method, further comprising generating the game screen with the background image taken by the camera in real time, when a single player mode is activated by a key input.

There is also provided the wireless gaming method further comprising synchronizing the game data with the real image.

There is also provided the wireless gaming method wherein the synchronizing is to provide location persistency between the game data and the real image.

There is also provided the wireless gaming method wherein the synchronizing is to provide object persistency between the game data and the real image.

There is also provided the wireless gaming method further comprising synchronizing the background image of the terminal with the background image of the at least one other terminal.

There is also provided the wireless gaming method further comprising detecting relative position and orientation between the terminal and the counterpart terminal.

There is also provided the wireless gaming method further comprising tracking motion between the terminal and the counter part terminal.

There is also provided the wireless gaming method comprising navigating through an area of the game screen by changing a field of view of the camera.

According to other embodiments of the present invention, there is provided a wireless gaming-enabled mobile terminal comprising:

a camera unit for taking an image;

a video processing unit for processing the image;

an input unit for receiving a user input;

a control unit for generating a game screen by combining a video data output from the video processing unit and graphic data of a game;

a display unit for displaying the game screen;

a short range wireless communication unit for establishing a game network with at least one other terminal in a multi-player gaming mode; and a storage unit for storing game data including the graphic data.

There is also provided the wireless gaming-enabled mobile terminal wherein the game network is an ad hoc network.

There is also provided the wireless gaming-enabled mobile terminal, wherein the control unit generates, if a single player gaming mode is selected, the game screen using the image taken by the camera as a background image of the game.

There is also provided the wireless gaming-enabled mobile terminal, comprising a camera navigation unit for tracking a motion on the basis of the image taken by the camera.

There is also provided the wireless gaming-enabled mobile terminal, wherein the control unit discovers, if a multi-player gaming mode is selected, terminals on the game network and displays discovered terminals on the display unit.

There is also provided the wireless gaming-enabled mobile terminal, wherein the control unit transmits, if a terminal is selected as a counterpart terminal, a multi-player gaming mode request message to the counterpart terminal.

There is also provided the wireless gaming-enabled mobile terminal, wherein the control unit performs, if an acknowledgement message is received in response to the multi-player gaming mode request message, synchronization with the counterpart terminal.

There is also provided the wireless gaming-enabled mobile terminal, wherein the control unit checks a round trip time by transmitting an average packet.

There is also provided the wireless gaming-enable mobile terminal, wherein the control unit transmits a game start signal to the counterpart terminal for starting the game in a ½ of the round trip time.

There is also provided the wireless gaming-enabled mobile terminal, wherein the control unit generates the game screen by combining the image taken by the camera unit and the graphic data synchronized between the terminals.

There is also provided the wireless gaming-enabled mobile terminal, wherein the control unit exchanges game data generated during the game with the counterpart terminal in real time through the short range wireless communication unit.

There is also provided the wireless gaming-enabled mobile terminal, wherein the control unit performs motion tracking on the basis of the image taken by the camera unit.

There is also provided the wireless gaming-enabled mobile terminal, wherein the control unit processes simultaneous operations of a same play in the terminals, using a random algorithm.

There is also provided the wireless gaming-enabled mobile terminal wherein the camera navigation unit provides synchronization between the video data output with the graphic data.

There is also provided the wireless gaming-enabled mobile terminal wherein the synchronization provides location persistency.

There is also provided the wireless gaming-enabled mobile terminal wherein the synchronization provides object persistency.

There is also provided the wireless gaming-enabled mobile terminal wherein the camera navigation unit provides in multi-player game mode synchronization of the video data output of the multi-players.

There is also provided the wireless gaming-enabled mobile terminal wherein the game screen extends over an area that is larger than a field of view of the display unit.

There is also provided the wireless gaming-enabled mobile terminal wherein navigation through the area of the game screen is by changing the field of view of the camera.

There is also provided the wireless gaming-enabled mobile terminal comprising a graphical user interface including a radar map to indicate the location of the field of view of the display unit in relation to the area of the game screen.

There is also provided the wireless gaming-enabled mobile terminal comprising a graphical user interface including a radar map to indicate the location of the graphic data in relation to the area of the game screen.

There is also provided the wireless gaming-enabled mobile terminal including at least one gyroscope to detect motion of the camera.

There is also provided the wireless gaming-enabled mobile terminal including at least one gyroscope to detect change in orientation of the mobile terminal.

There is also provided the wireless gaming-enabled mobile terminal wherein the storage unit is to store an initial orientation of the mobile terminal.

There is also provided the wireless gaming-enabled mobile terminal wherein the gyroscope is to detect translation of the camera.

There is also provided the wireless gaming-enabled mobile terminal wherein the graphic data includes a virtual animal trapped in a balloon.

There is also provided the wireless gaming-enabled mobile terminal wherein the graphic data includes a text box anchored to an object in the video data output.

There is also provided the wireless gaming-enabled mobile terminal wherein the graphic data includes building blocks to be positioned on a foundation defined by an object in the video data output.

BRIEF DESCRIPTION OF THE DRAWINGS

The subject matter regarded is particularly and distinctly claimed in the concluding portion of the specification. The invention, however, may be understood by reference to the following detailed description of non-limiting exemplary embodiments, when read with the accompanying drawings in which:

The above and other objects, features and advantages of the present invention will be more apparent from the following detailed description in conjunction with the accompanying drawings, in which.

Figure 1:
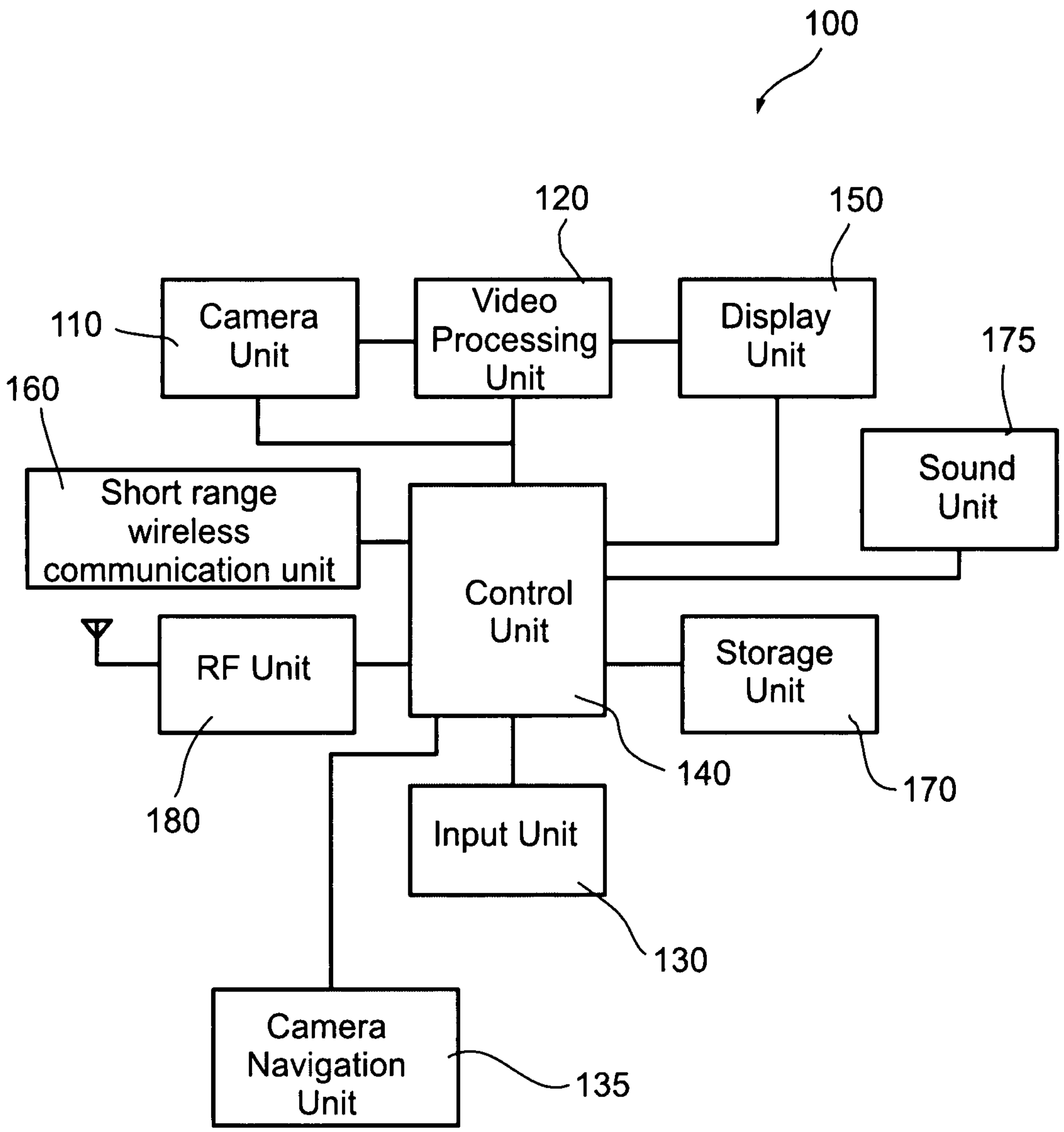
FIG. 1 is a block diagram illustrating a configuration of a wireless gaming-enabled mobile terminal according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EXEMPLARY EMBODIMENTS

In the following description, exemplary embodiments of the invention incorporating various aspects of the present invention are described. For purposes of explanation, specific configurations and details are set forth in order to provide a thorough understanding of the embodiments. However, it will also be apparent to one skilled in the art that the present invention may be practiced without all the specific details presented herein. Furthermore, well-known features may be omitted or simplified in order not to obscure the present invention. Features shown in one embodiment may be combinable with features shown in other embodiments, even when not specifically stated. Such features are not repeated for clarity of presentation. Furthermore, some unessential features are described in some embodiments.

FIG. 1 is a block diagram illustrating a configuration of a wireless gaming-enabled mobile terminal according to an exemplary embodiment of the present invention.

Referring to FIG. 1, a wireless gaming enabled-mobile terminal 100 includes a camera unit 110 for taking a picture, a video processing unit 120 for processing the picture by the camera unit 110, an input unit 130 for receiving a user input, a control unit 140 for generating a game screen by combining a video signal output from the video processing unit 120 and a game graphic source of a specific game in accordance with an input signal received through the input unit 130, a camera navigation unit 135 to perform motion tracking on the basis of images and/or video stream captured by the camera unit 110, a display unit 150 for displaying the game screen generated by the control unit 140, a sound unit 175 for generating sounds during play, a short range wireless communication unit 160 for establishing a radio connection with another mobile terminal in a multi-player gaming mode gaming mode, and a storage unit 170 for storing application including game data.

In some examples, during multi-playing, sound output from sound unit 175 may be synchronized between the multi-players.

The camera unit 110 is implemented with an image pickup device or an image sensor such as a charged coupled device (CCD) and a complementary metal-oxide semiconductor (CMOS) device, for converting optical image into electric signals.

The video processing unit 120 can be implemented with an analog-digital converter for the electric signal output from the camera unit 110 into digital signals as video data.

The input unit 130 can be implemented with at least one of a keypad and touchpad. The input unit 130 also can be implemented in the form of a touchscreen on the display unit 150.

The camera navigation unit 135 may be based on available CaMotion Inc. libraries, Eyemobile Engine software offered by Gesturetek's, or other available camera based tracking engines. The navigation unit may perform motion tracking on the basis of images and/or video stream captured by the camera unit 110. That is the camera navigation unit 135 extracts a plurality of tracking points by detecting outlines of objects from a previous background image and matches the movement of the graphic image and/or the virtual world with a change of the background image and/or the real world. The virtual world may expand beyond the field of view and/or the margins of the display unit 150. Camera navigation may provide a natural way to increase the field of view of the screen allowing the player to pan through a larger virtual world of the game screen with, for example sweeping hand motions. In some examples, the camera navigation unit 135 may serve as an input unit, e.g. and additional input unit, where specific gestures by the user may be interpreted as user commands. For example, a quick tilting gesture, e.g. a rotational motion may be used as an input command to shoot. Other gestures may serve as input commands. In some example, the camera navigation unit 135 may be integral to the control unit 140.

According to some embodiments of the present invention, one or more gyroscopes may be included within the mobile terminals in one or more positions in each of the terminal devices for example in one or more positions distanced apart from each other. In one example, one or more gyroscopes may be used to track position, translation, and rotation of each of the mobile terminals and position, translation, and rotation, e.g. orientation, between the mobile terminals. For example, if three gyroscopes are positioned within the mobile terminal, for example distanced apart, the motion of the mobile terminal may be tracked in six degrees of freedom.

In one example, gyroscope output may be used to correct camera motion tracking and/or gyroscope output may be used to indicate when camera motion tracking should begin. For example, camera motion tracking may be initiated only when one or more gyroscope outputs indicate that the mobile device shifted and/or moved. Other methods of combining output of camera motion tracking and gyroscope motion tracking may be used. The combination of camera motion tracking and gyroscope motion tracking may be used to save processing power of the mobile terminal devices and/or to increase accuracy of the motion tracking. In some examples, camera motion tracking may be more expensive processing than gyroscope motion tracking. A combination of camera motion tracking and gyroscope motion tracking may be used to optimize and/or minimize use of processing power. In other examples, a combination of gyroscope motion tracking and camera motion tracking may increase the accuracy of the motion tracking.

In one example, output from one or more gyroscopes may be used to define the orientation between the multi-players and to synchronize the video imagery between the multi-players. For example when multi-players may choose to synchronize the video imagery of the gaming screen by initiating gaming while pointing to a defined object as may be described herein, recording and communication of gyroscope output may be used to determine in real time orientation and motion between terminal devices. Initial orientation between terminals may be stored in storage unit 170.

The short range wireless communication unit 160 can be implemented with a wireless personal area network (WPAN) module such as a Bluetooth module and an Infrared Data Association (IrDA) module so as to enable establishing an ad hoc network of the mobile terminals equipped with identical WPAN module.

Figure 2A:
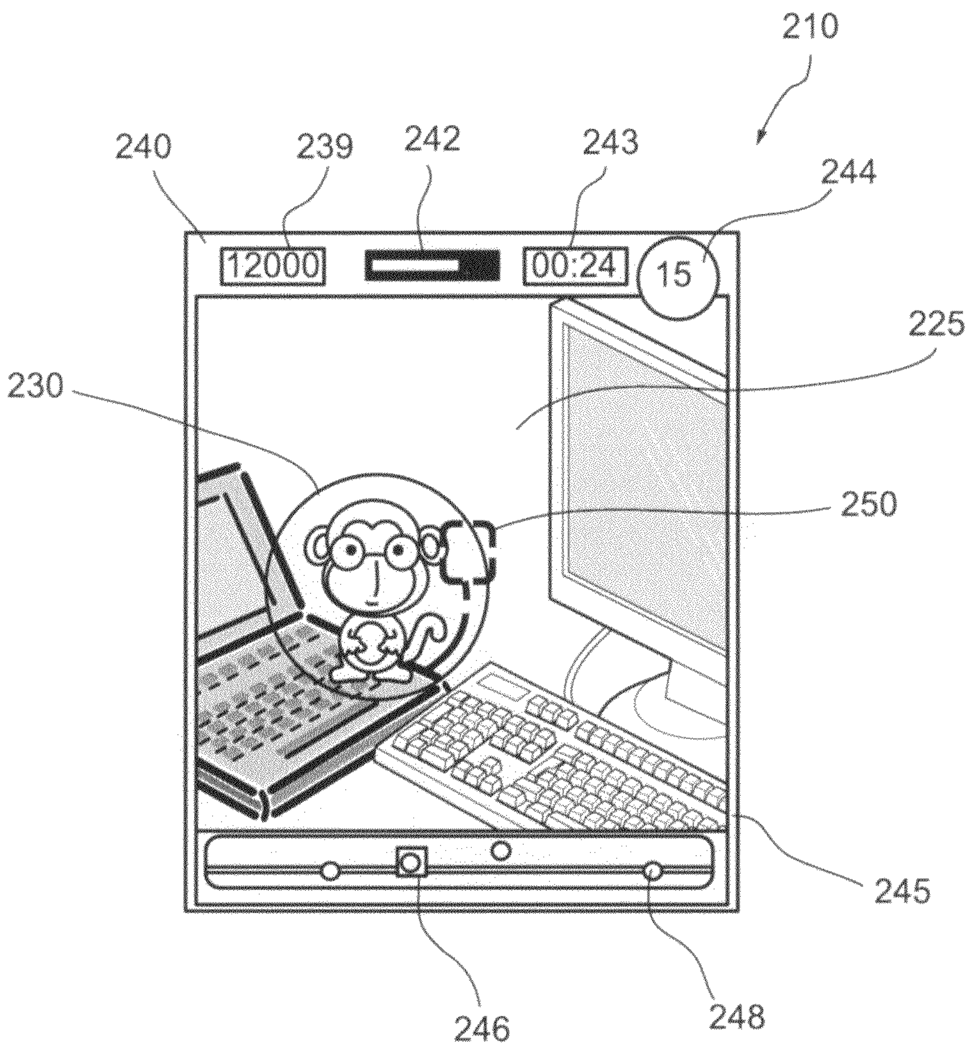
FIGS. 2*a* and 2*b* are screen images illustrating a game screens in a single player gaming mode and a multi-player gaming mode of a wireless gaming-enabled mobile terminal of FIG. 1 according to an exemplary embodiment of the present invention.

The control unit 140 controls the camera unit 110 to take an image in response to a command, for executing a specific game, input through the input unit 130. If the camera unit 110 starts taking images, the control unit 140 controls the video processing unit 120 to process the image and receives the video data from the video processing unit 120. Simultaneously, the control unit 140 reads graphic data defining a virtual world associated with the game to synthesize with the image taken by the camera unit 110, defining a real world for generating the game screen and then displays the game screen on the display unit 150 as shown in FIG. 2*a*. The game screen provides an augmented reality including both a virtual world with one or more graphics and/or virtual objects and a real world including images captured in real time by the camera unit 110.

Figure 2B:
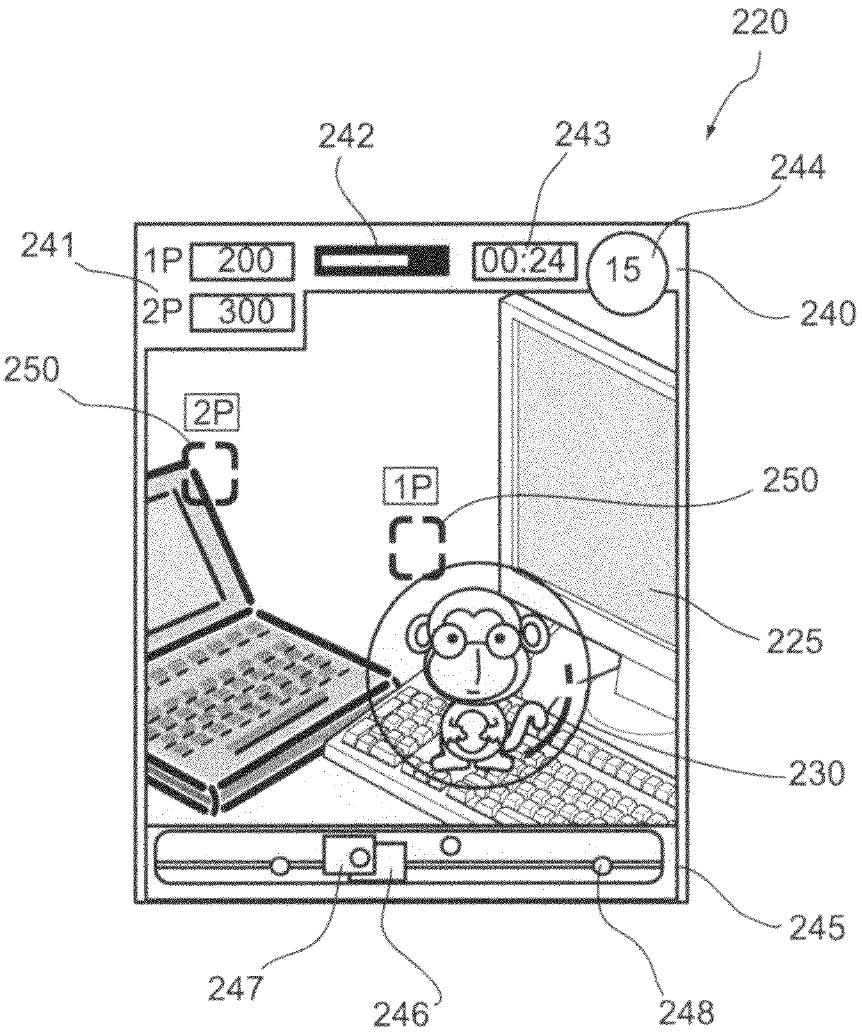

FIG. 2*a* is a screen image illustrating a game screen in a single player gaming mode of a wireless gaming-enabled mobile terminal of FIG. 1, and FIG. 2*b* is a screen image illustrating a game screen in a multi-player gaming mode of a wireless gaming-enable mobile terminal of FIG. 1.

The single player gaming mode means a game mode in which one user takes part in the game, and the multi-player gaming mode means a game mode in which at least two users take part in a game through an ad hoc network established between the participants' mobile terminals using the WPAN module.

In this embodiment, the present invention is described with a shooting game for rescuing an animal caught in a balloon by shooting the balloon, as an example.

Referring to FIG. 2*a*, the game screen 210 of the shooting game includes a background image 220 which is taken by the camera unit 110 and graphic images 230 on the background image 225. The game screen 210 is provided, at the top, with an information bar 240 presenting the game-related information such as a score 239, a number of remained bullets 244, and remained time 243, and at the bottom, with a radar map 245 presenting a user's view point 246 and positions of balloons 248 and/or other virtual objects. If the user's view point is overlapped with a position of a balloon by moving the user's view point, the balloon is positioned at the center of the game screen, where a central focusing bracket 250 is positioned, is aimed at.

The radar map 245 may map out for the user the entire virtual world showing where graphic objects (e.g. virtual objects) may be positioned and where the user's screen view is in relation to the positioning of the virtual objects in the defined virtual world. Camera Navigation provides synchronization between changes in the virtual field of view and changes in the real world field of view. So if a player moves the camera away from a current field of view where for example a balloon creature is present and then returns to that same field of view, the balloon creature will appear in the same general location in relation to the real world objects.

The player can aim at the balloon by moving the mobile terminal 100 such that the user's view point is overlapped with the position of a balloon. At this time, the background image 225 is taken in real time such that the background image is changed in accordance with the movement of the mobile terminal 100.

In order to take the background image in real time, the camera navigation unit 135 can perform a motion tracking on the basis of the image taken by the camera unit 110. That is the camera navigation unit 135 extracts a plurality of tracking points by detecting outlines of objects from a previous background image and matches the movement of the graphic image with a change of the background image.

Reference is now made to FIG. 2*b* showing a screen image illustrating a game screen in a multi-player gaming mode of a wireless gaming-enable mobile terminal of FIG. 1, according to an exemplary embodiment of the present invention. The game screen 220 of shooting game includes a background image 225 which is taken by the camera unit 110 and graphic images 230 overlaid on the background image. The game screen is provided, at the top, with an information bar 240 presenting the game-related information such as a score of each of the players 241, a number of remained bullets 242 of one or both the players, remained time 243, and number of bubble creatures remaining 244, and at the bottom, with a radar map 245 presenting a user's view point 246, an opponents view point 247 and positions of balloons and other virtual objects 248. If the user's view point is overlapped with a position of a balloon by moving the user's view point, the balloon is positioned at the center of the game screen, where a central focusing bracket 250 is positioned, is aimed at. In addition, the opponent's central focusing bracket 251 may be displayed. The player can track the opponent's focusing bracket 251 and try to pop balloons before the opponent gets to it. Both players are sharing the same virtual world and may simultaneously compete over popping the same balloons. Each player may see in real time the position and movement of the counter player and may plan their respective strategy accordingly.

If a command for executing a multi-player gaming mode is input through the input unit 130, the control unit 140 controls the short range wireless communication unit 160 to scan radio channels to detect another mobile terminal that attempts to join the game (for example, a mobile terminal belonging to a friend).

Figure 3A:
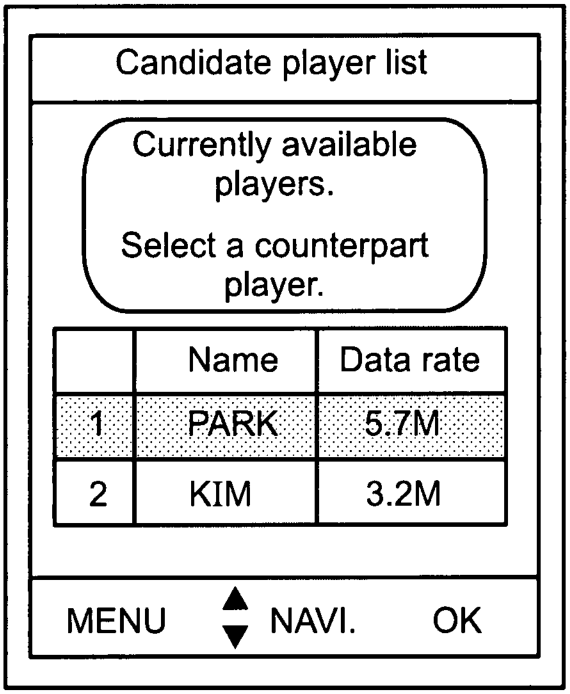
FIGS. 3*a* and 3*b* are screen images illustrating candidate player information screens for a multi-player gaming mode of the wireless gaming-enable mobile terminal according to an exemplary embodiment of the present invention.
Figure 3B:
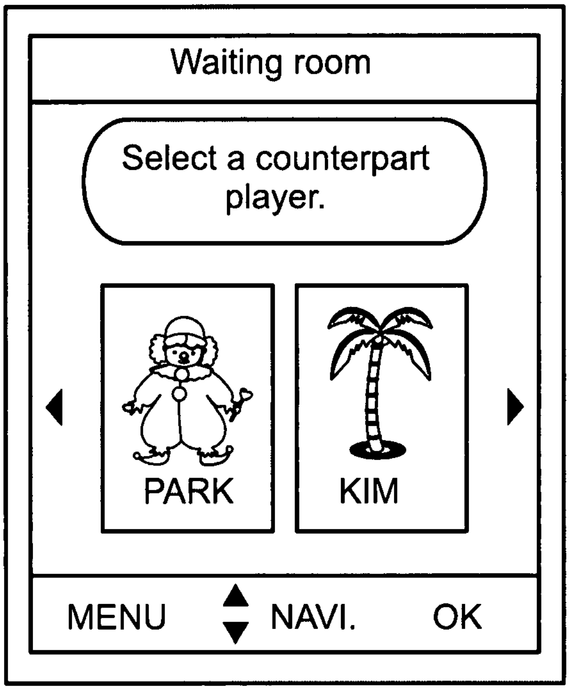

If at least one mobile terminal attempting to join the game is detected, the control unit 140 displays information on the mobile terminal attempting to join the game (for example, a game ID, participant name, or phone number) in the form of a candidate player list as shown in FIG. 3*a* or a virtual character representing the candidate player as is shown in FIG. 3*b*. The candidate player list can include channel status information such as available data rate of each candidate player.

FIGS. 3*a* and 3*b* are screen images illustrating candidate player information screens for a multi-player gaming mode of the wireless gaming-enable mobile terminal according to an exemplary embodiment of the present invention.

If one of the candidate players is selected from the candidate play information screen, the control unit 140 transmits a multi-player gaming mode request message to the mobile terminal of the selected candidate player through the short range wireless communication unit 160. If the multi-player gaming mode request message is received, the counterpart mobile terminal displays a notification message such as "XXX invites you for xxx game. Accept the invitation?" in response to the multi-player gaming mode request message. If a command for accepting the invitation is input by the candidate player, the counterpart mobile terminal transmits an acknowledgement message to the host mobile terminal 100.

Upon receiving the acknowledgement message, the control unit 140 of the host mobile terminal 100 performs synchronization with the counterpart mobile terminal and generates and displays a game screen on the display unit 150. After obtaining the synchronization, the control unit 140 of the host mobile terminal 100 may check a round trip time to the counterpart mobile terminal. A round trip time is the time elapsed for a message transferred to the counterpart mobile terminal and back again.

For checking the round trip time, the host mobile terminal 100 may transmit an average packet to the counterpart mobile terminal and count until an average response packet is arrived from the counterpart mobile terminal. Also, the counterpart mobile terminal can check the round trip time in the same manner. The round trip time can be measured in unit of 1/1000 sec. After the round trip time is checked, the control unit 140 of the host mobile terminal 100 transmits game parameters to the counterpart mobile terminal. The game parameters include information on the game such as initial positions of the balloons. Such parameters are stored in the storage unit 170. The parameters include positions, rising speeds, number, and kinds, of the balloons, and are determined according to a difficulty level of the game. Other parameters related to the opponent, e.g. ID code of the opponent(s), may be transmitted. During the course of the game, round trip time may be measured and updated. Changes in round trip time may occur due to changing distance between the opponents, changes in battery charge level, as well as other reasons. If round trip time is delayed, transmission of data may be delayed, less data and/or minimally required data may be transmitted.

The control unit 140 of the host mobile terminal 100 synthesizes the video data output from the video processing unit 120 as the background image of the game and the graphic data among the synchronized game data such that the game screen such as FIG. 2*b* is generated where for example, the game data and/or the virtual world is similar for each of the players. Also, the counterpart mobile terminal synthesizes an image taken by its camera unit as the background image of the game and the graphic data among the synchronized game data so as to display a game screen on its display unit. The game screen of the multi-player gaming mode is similar to that of the single player gaming mode, except that the information bar includes a score, a location as well as other relevant information of the counterpart player.

That is, the mobile terminals of participants in the game share the same graphic data but not necessarily the background image such that the game screens of the two mobile terminals show the same graphic data and game information on the different background image. In a case that the counterpart mobile terminal is not equipped with a camera unit, the counterpart mobile terminal can use a previously stored image or the image transmitted from the host mobile terminal 100 as the background image of the game.

According to another embodiment of the present invention, the background image, e.g. the video imagery captured by the individual cameras of the players may be synchronized at a low level, for example by playing the game in the same general location and/or environment, e.g. the same room while aiming the camera's view in the same general direction. For example, the players may be playing in a classroom and saving balloon creatures floating around their real world peers and teachers. Players may correspond with each other regarding the relative location of the balloon with respect to the real world, e.g. the video imagery, for example to announce to a counter player the location of the creatures that he is aiming to shoot. Correspondence may be by transmitting sound bites through wireless connection between the players and/or by conventional correspondence when the two players are sitting next to each other. For example one player can announce to the counter player that he is about to pop a balloon over the teachers head. The counter player may quickly move his camera to watch and/or to try to pop the balloon first.

According to yet another embodiment, the background image may be synchronized at a high level, for example, by initiating game start when all players direct their camera views to a specific single object in the area of play, e.g. all players may focus their camera on a vase placed in the center of a room, on a person's face, etc. According to some embodiments of the present invention, the players may be asked to enter their positions and angle relative to each other so as to overcome and/or reduce errors do to the parallax effect. Tracking motion sampled from a gyroscope may be implemented to synchronize background image between the two players.

According to one embodiment of the present invention, the video processing unit 120 may use image processing to identify the specific object that the players may use to synchronize their background image, real worlds. Data regarding recognition of the object may be saved in storage unit 170. The coordinate system that may define the position of the virtual objects in relation to the real world video imagery may be defined in relation to the recognized object in the real world. As such all users will share the same virtual world superimposed and/or displayed on the same real world, e.g. the same real time video imagery. So that if there is a balloon creature positioned on the teachers head in one players display unit, the same balloon creature will be displayed on the teachers head for all the players.

If the game is started, the host mobile terminal 100 and counterpart mobile terminal exchange the game data so as to share the achievements of the opponent in real time. For example, if the counterpart mobile terminal rescues a monkey out of a balloon by shooting the balloon, the control unit 140 of the host mobile terminal 100 receives the data associated with the rescue through the short range wireless communication unit 160 and displays on the game screen 220 (on its display unit 150), shooting the balloon and rescues the monkey out of the balloon by the counterpart player with the increment of the score.

In order to activate the multi-player gaming mode, the control unit 140 may operates with a random algorithm. That is, when the players of the host and counterpart mobile terminals act their actions at the same time (for example, the two players shoot the balloon at the same time), the control unit 140 of the host mobile terminal 100 increases at least one of the scores of the two players using the random algorithm.

According to another embodiment of the present invention, information on successful balloon shooting is not displayed and/or communicated to the players until a round trip checkup and/or confirmation as to which of the players shoot the bubble first is performed. For example if a host player shoots at a balloon, data regarding that balloon shooting event is transmitted to the counterpart player's terminal. The counterpart player's terminal checks if the same balloon was also shot at by the counterpart player. The player with the earlier time stamp gets credit for shooting balloon. Indication as to who got credit for shooting the balloon is given to both players.

For example, before the balloon disappears, it may be outlined with a color associated with the particular player that is to get credit for shooting the balloon and that players points are incremented. In other examples, there may be specific graphics indicating the event of a balloon popping. For example, graphics indicating a bubble and/or balloon burst maybe displayed in a color associated with the player that is to get credit for shooting the balloon. In one example, delay due to the round trip checkup may in the order of 20-50 msec. Other delay times and other methods of indication may be implemented. The mobile terminal 100 can include a radio frequency (RF) unit 180 for cellular communication such that the mobile terminal 100 can establish a communication channel for voice and short message exchange and wireless Internet access.

The mobile terminal can further include at least one of a slot for attaching an external storage medium such as a memory card, a broadcast receiver for receiving broadcast signals, an audio output unit such as a speaker, an audio input unit such as a microphone, a connection port for connecting an external device, a charging port, a battery for supplying power, a digital audio playback module such as an MP3 module, and a subscriber identity module for mobile commercial transaction and mobile banking.

Although all kinds of device convergences are not set forth in the description, it is understood, to those skilled in the relevant art, that various digital appliances and modules and their equivalents can be converged with the mobile terminal.

Figure 4:
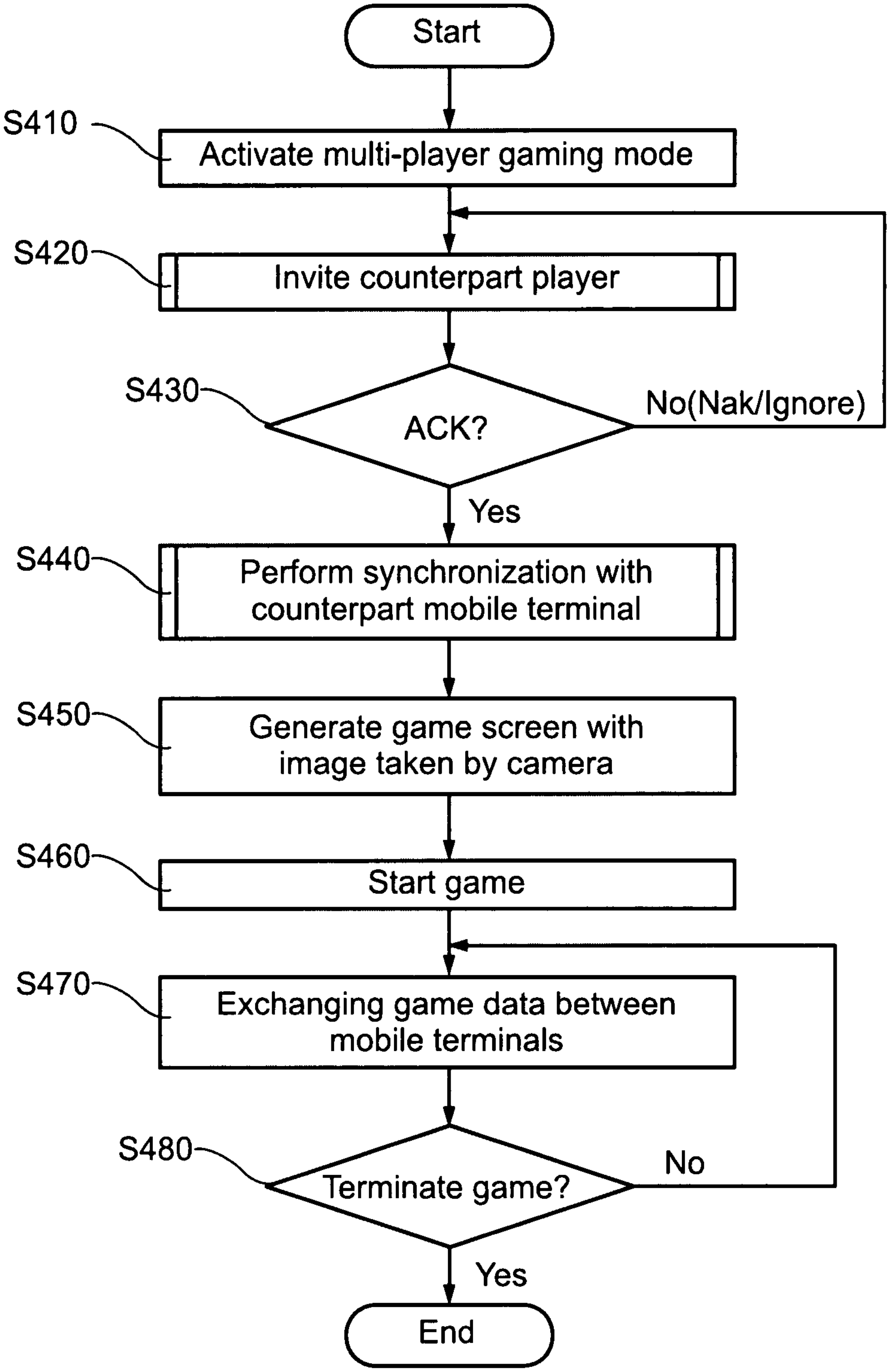
FIG. 4 is a flowchart illustrating a wireless gaming method according to an exemplary embodiment of the present invention.

FIG. 4 is a flowchart illustrating a wireless gaming method according to an exemplary embodiment of the present invention.

In this embodiment, the wireless gaming method includes inviting, if a multi-player gaming mode for a game is activated, at least one counterpart terminal on a short range wireless communication network by transmitting a multi-player gaming mode request message; synchronizing, if an acknowledge message is received in response to the multi-player gaming mode request message, game data with the counterpart terminal transmitted the acknowledge message; and generating a game screen with an image taken by the camera as a background image after the game is synchronized; and starting the game with the game screen.

Referring to FIG. 4, if a command for activating a multi-player gaming mode is input, a host mobile terminal executes the multi-player gaming mode with a specific game (S410) and invites at least one candidate player by transmitting a multi-player gaming mode request message to counterpart mobile terminal of the candidate player (S420). The invitation process is described in more detail with reference to FIG. 5.

Figure 5:
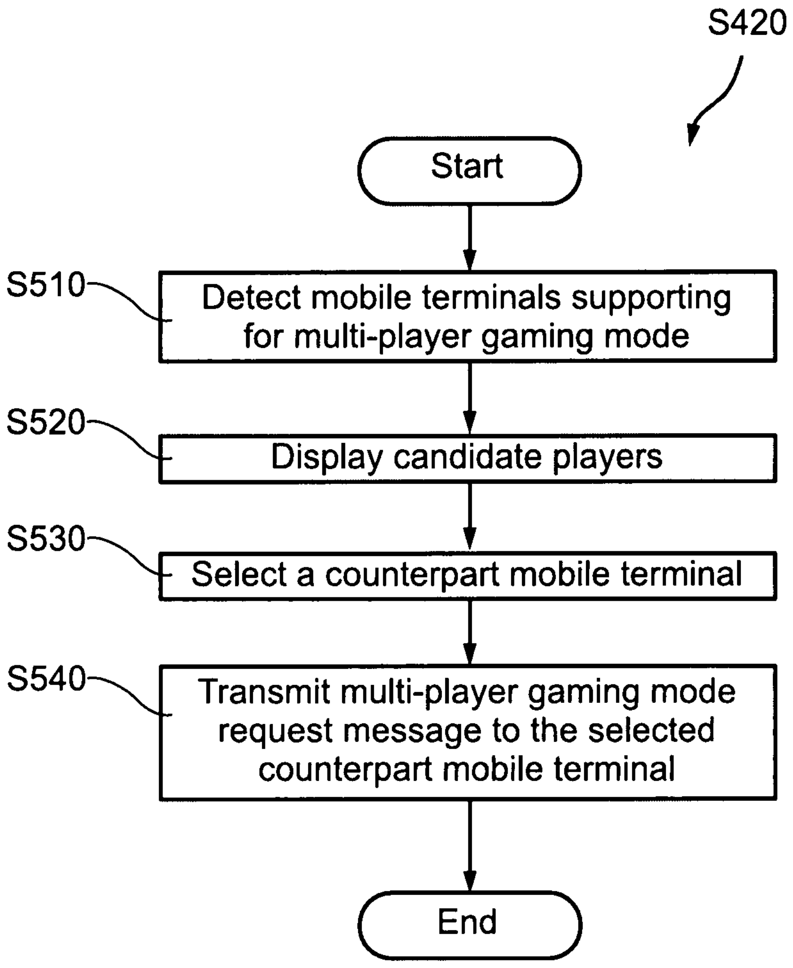
FIG. 5 is a flowchart illustrating a counterpart player invitation process of the wireless gaming method of FIG. 4 according to an exemplary embodiment of the present invention.

FIG. 5 is a flowchart illustrating a counterpart player invitation process of the wireless gaming method of FIG. 4.

As shown in FIG. 5, in the counterpart player invitation process, the host mobile terminal scans short range wireless network channels to detect mobile terminals supporting for the multi-player gaming mode (S510). If at least one mobile terminal is detected over the short range wireless network channel, the host mobile terminal displays information on the detected mobile terminal in the form of a candidate player list or a character image representing the candidate player (S520). Next, the host mobile terminal selects a candidate player in accordance with a command input through an input unit (S530) and then transmits a multi-player gaming mode request message to the counterpart mobile terminal (S540). If the multi-player gaming mode request message is received, the counterpart mobile terminal displays an invitation notification message.

After transmitting the multi-player gaming mode request message, the host mobile terminal 100 determines whether an acknowledgement message is received in response to the multi-player gaming mode request message (S430).

If an acknowledgement message is received, the host mobile terminal performs synchronization with the counterpart mobile terminal (S440). In contrast, if a negative acknowledgement message is received from the counter part mobile terminal, the host mobile terminal repeats the step S420 for inviting another mobile terminal. The synchronization process is described in more detail with reference to FIG. 6.

Figure 6:
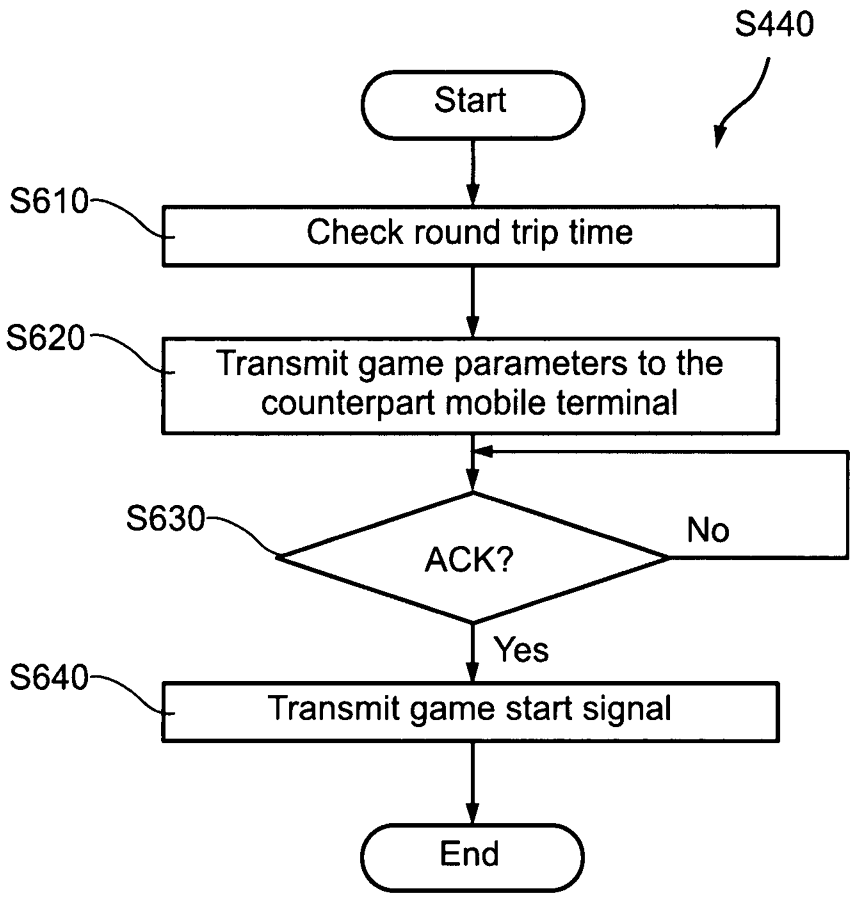
FIG. 6 is a flowchart illustrating a synchronization process of the wireless gaming method of FIG. 4 according to an exemplary embodiment of the present invention.

FIG. 6 is a flowchart illustrating a synchronization process of the wireless gaming method of FIG. 4.

As shown in FIG. 6, if the acknowledgement message is received from the counterpart mobile terminal, the host mobile terminal checks a round trip time to the counterpart mobile terminal (S610). In order to check the round trip time, the host mobile terminal transmits an average packet and counts until an average response packet is arrived from the counterpart mobile terminal.

After checking the round trip time, the host mobile terminal transmits game parameters to the counterpart mobile terminal (S620). The game parameters include information on the game such as initial positions of balloons as well as other relevant information.

After transmitting the game parameters, the host mobile terminal determines whether an acknowledgement message is received (S630). If an acknowledgement message is received in response to the game parameters, the host mobile terminal transmits a game start request message, for instructing to start the game in a predetermined time, to the counterpart mobile terminal (S640). The predetermined time can be set to ½ of the round trip time.

After the host mobile terminal obtained the synchronization with the counterpart mobile terminal, the host mobile terminal generates a game screen (S450).

At this time, the control unit 140 of the host mobile terminal 100 controls the camera unit 110 to start taking image and the video processing unit 120 to convert the signal input from the camera unit 110 into the video data. The control unit 140 synthesizes the graphic data of the game data and the background image output from the video processing unit 120 so as to generate the game screen as shown in FIG. 2*b*. The game screen can be generated during the synchronization process (S440) or in a predetermined time after the synchronization process is completed.

After generating the game screen, the control unit 140 controls to start the game (S460). Once the game is started, the host mobile terminal 100 and the counterpart mobile terminal exchange the game data for sharing the operations with each other in real time until the game ends or until the game is terminated (S470 and 480).

At this time, in order to match the game graphic with the change of the background image according to the movement of the camera, the camera navigation unit 135 can use a motion tracking technique. The control unit 140 also can periodically check the round trip time. The round trip time may change in accordance with the variation of the communication environment such as variation of remained battery power and distance between the mobile terminals participated in the game. The control unit may use a random algorithm and/or prediction for processing simultaneous operations of the players.

In both single player and multi-player gaming mode, the control unit 140 generates the game screen using the image input through the camera unit in real time as the background image of the game.

According to some embodiments of the present invention, synchronization between the background image and the graphic data may support location persistency, so that a player can move the mobile terminal and discover new targets to shoot and then move the mobile terminal back to the same field of view and see the previous targets in that view e.g. if the balloon was seen on a table before the player moved the mobile terminal, upon returning to the same view the balloon may remain in the vicinity of the table. According to other embodiments of the present invention, synchronization between the background image and the graphic data may support object persistency, so that if a balloon is initially shown to be positioned over a computer mouse and then the player moves the mobile terminal to pan a different scenery, when the player returns to view the computer mouse the balloon will still be positioned over the computer mouse. Object persistency may be accomplished based on known image processing techniques for object recognition to identify distinguishing features in the background video view, for example to recognize objects. Other suitable methods may be implemented, e.g. edge detection, color change detection and/or a combination of more than one method to identify and/or recognize key objects in a background video imagery that may be used as anchors, to anchor the virtual world to the video imagery.

According to some embodiments of the present invention, during multi-player gaming mode, communication between the two mobile terminals may be used to correct drift, e.g.

drift due to errors accumulated in the camera navigation between the players. For example, two or more players may have “real-world” references, e.g. the system may anchor graphic data to a reference in the background image, and the different terminals may synchronize the position of the graphic data to their position in the “real-world”. In this way, the drifts may be minimized so that the user may not notice them. Once the mobile terminal is positioned and/or located in front of a reference object his position is recalculated and the drift omitted.

Figure 7:
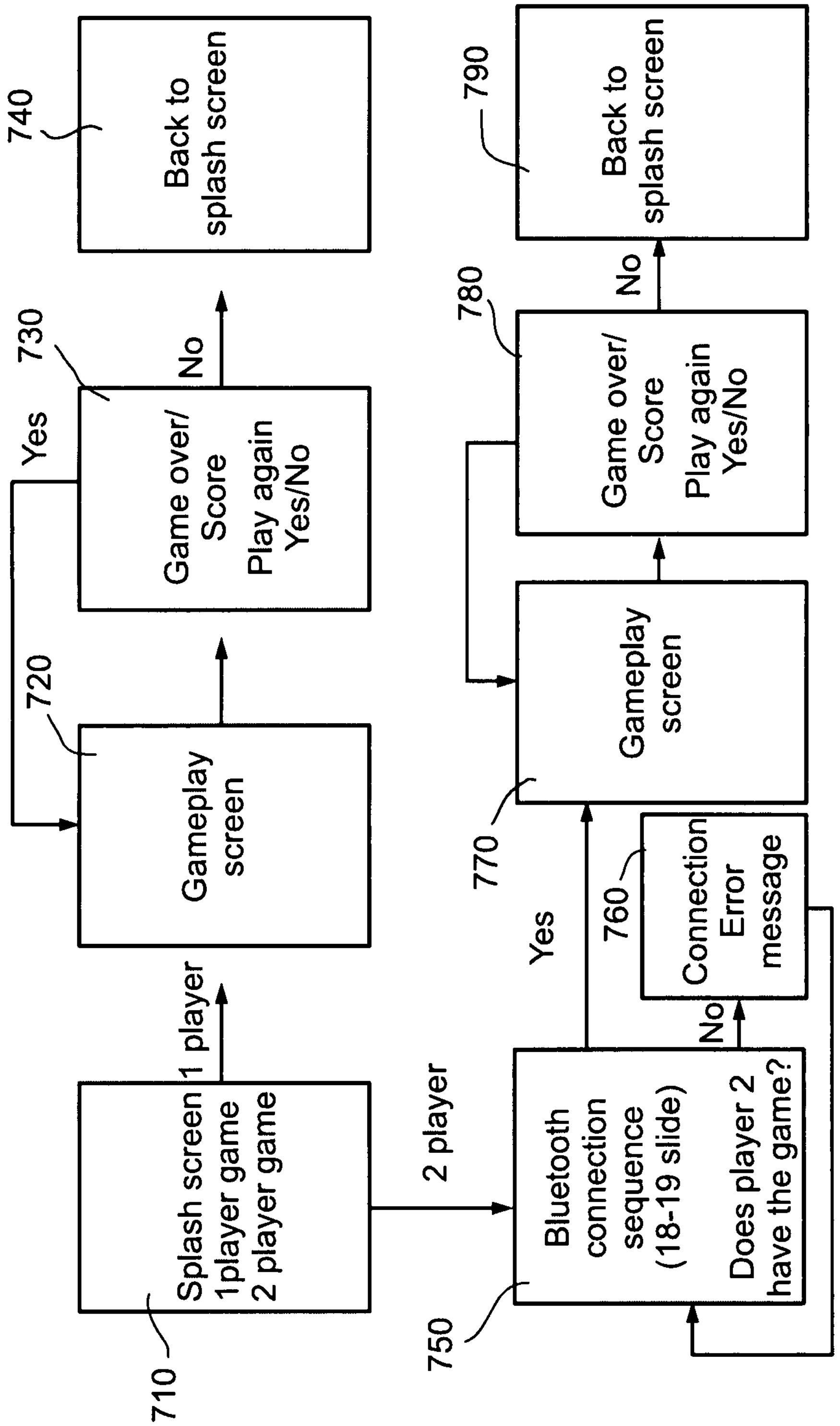
FIG. 7 is a block diagram illustrating a game flow according to an exemplary embodiment of the present invention.

Reference is now made to FIG. 7 showing a block diagram describing an exemplary game flow according to embodiments of the present invention. At game initialization a splash screen may be displayed (block 710) where the user may choose between single-player or multi-player mode, e.g. 2 players. For single player mode, the game screen may be activated (block 720) and the player may play the game until a game over. In block 730, upon game over, a player may choose to play or to stop playing. If the user decides to stop playing the splash screen is activated again (block 740). If the player decides to play again, the game screen is activated (block 720). When multi-player mode is chosen, a Bluetooth connection sequence is activated (block 750). If the second player has the game the game screen may be activated (block 770) and the players may play unit game-over. Otherwise a connection error screen message (block 760) may be displayed. If players decided to play again (block 780), the system will wait until all players confirm that they want to continue before starting a count down to game play. If the players choose not to play, the original splash screen may be reactivated (block 790).

Figure 8:
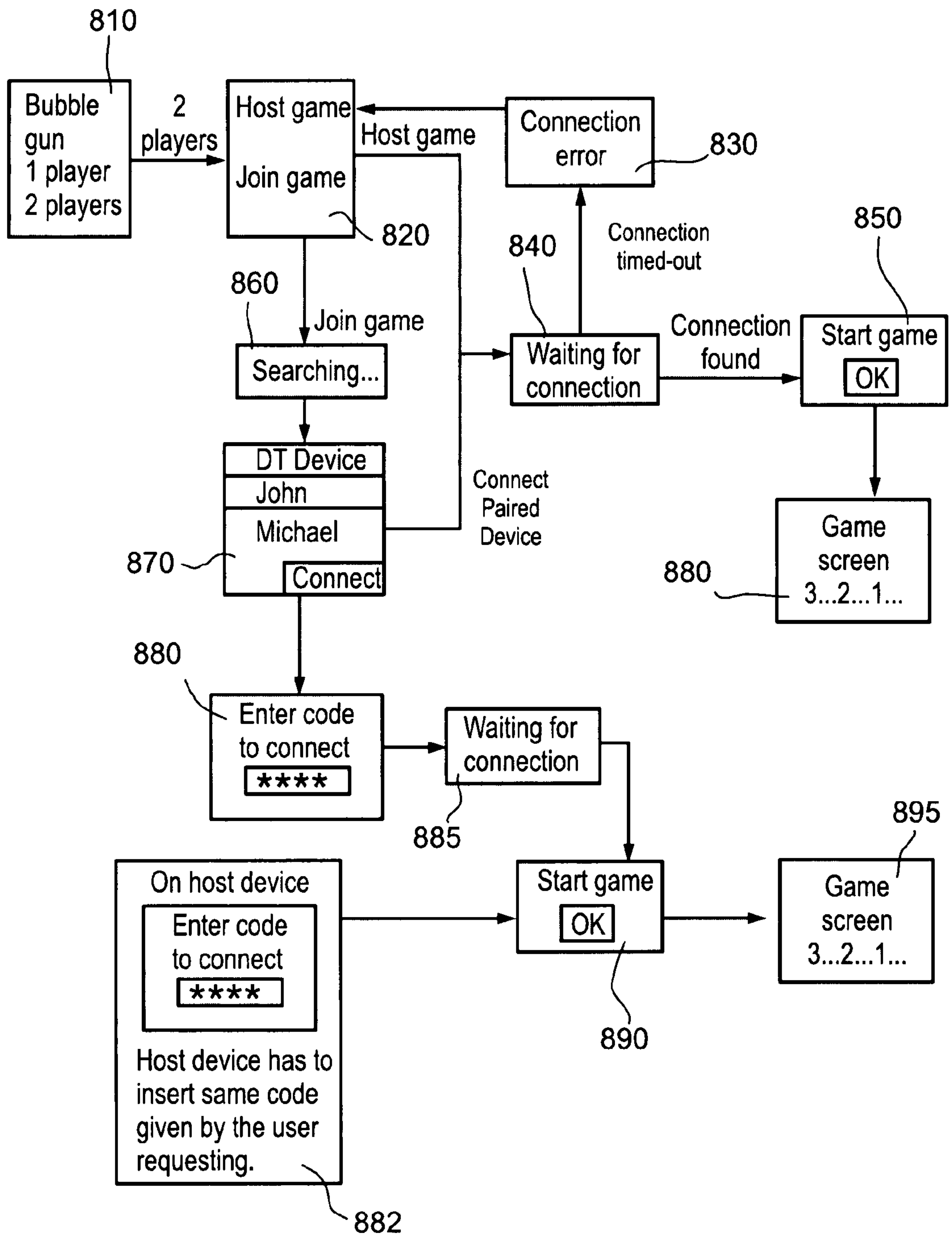
FIG. 8 is a block diagram illustrating a game initiation according to an exemplary embodiment of the present invention.

Reference is now made to FIG. 8 showing an exemplary block diagram for game initialization for multi-players according to an embodiment of the present invention. In block 810 a splash screen is activated where a player may decide to play in single player mode or in multi-player mode, e.g. a two player game. In multi-player mode, the player may choose to host a game or join a game (block 820). To join a game, the system may search for a counterpart terminal (block 860). In some examples, searching may timeout after a defined period, e.g. 30 seconds. Available mobile terminals with compatible communication, e.g. Bluetooth communication, may be displayed (block 870). The system may wait to connect with candidate player (block 840) and when connection is established the players may be requested to confirm that they are ready to start the game (block 850). An error message may be displayed to the requesting player if the connection attempt fails. (block 820). Once both and/or all players OK a countdown may be activated to game start (block 880). If the user chooses to host a game, the user’s name may be displayed in the list of candidate players (block 870). For terminals that may not be paired a request for a pin code is optionally shown on each of terminals (block 880). The host device will need to insert same code given by the requesting player (block 882) while the requesting player is waiting to establish a connection (block 885). After both terminals are paired and ready they will be requested to confirm that they would like to start the game (block 890). Pairing between devices is saved. Once both players have pressed OK a countdown will begin to start the game (block 895). Other methods may be used to initiate dual playing and or multi-playing. Although dual playing has been described in detail, the same system and method may be used to accommodate 3 or more players.

Although, a shooting at balloon game has been described in some detail, other implementations using the system and method described herein may be realized. For example, other wireless multi-player gaming method and system that are capable of configuring background of a game with images designated by a user may be designed.

In another embodiment, the present invention is described with a ghost catching game for catching virtual ghosts appearing in specific “real world” rooms. The mobile terminal may recognize one or more doors upon entering a room and display a defined virtual world synchronized with the real time background of that room.

The game may be played by a single player based game and/or multi-player game. In a single player mode, a player may race against a clock to catch all the ghosts. In multi-player mode, the players may race each other to catch all the ghosts in the different rooms and may create ghosts for counterpart players.

Optionally, the game is based on saved object recognition of background objects, e.g. doors. For example, one or more objects, e.g. doors may be recognized by the video processing unit 120 based on, for example, player pre-saved data. For example, prior to playing a player may capture images of a few different doors, e.g. 2 to 10 doors in a house, school, workplace, and/or in more than one house, and indicate to the terminal to save data that will enable the terminal to recognize these doors during gaming. Recognition of the door may be based on a pre-positioned markers placed on the door, e.g. name outside door, or barcode or room number. In another example recognition of the door may be based on specific features of the door, e.g. color.

A database may be setup by the players prior to playing the game. In order to define the augmented reality world, the player may be prompted by the terminal to capture a snapshot of each door, e.g. a door including a marking, possibly in more than one angle. An object other than a door may be used to identify entry into a new room. For example, a snapshot of a picture in a specific room may identify entry into a room. Other similar markers may be used to indicate exiting a room. Data may be saved in the storage unit 170 so that during gaming the video processing unit 120 and control unit 140 may recognize an image of the door, the bar-code, the name and/or image placed on the door. In other examples the rooms may be nested. For example, a maker may be used to identify a specific house and/or building. Rooms in that house may be identified as belonging to that house.

In some examples, a map may be provided showing for example, where other player may be positioned. The map may be, for example a real 3D map of the house and/or may show tunnels connecting the rooms.

Each of the recognized and/or defined doors may be associated with and may activate on the display unit a different augmented reality world, e.g. a different ghosts positioned in one or more locations in the room after passing and/or recognizing the door. During multi-player gaming, the host player transmits data required to recognize the doors and/or other defined objects as well a virtual world associated with each door to the counter player. The host and counterpart players may race and/or collaborate to catch or shoot, or otherwise interact with all the objects in each of the virtual worlds. Some objects may be an oracle.

In another embodiment, the present invention may be described with an augmented building block game for constructing virtual towers over “real world” foundations. For example, a player may build a virtual building in the real environment with actual physical laws applying, e.g. the building may need to be structurally sound and if placed on a ledge displayed in the background screen, may fall off and smash. Players may collaborate and/or compete, e.g. compete for constructing the tallest tower. During collaboration, each player may have a turn to place a building block to build a tower.

In one example, a player may be provided with a tool box including one or more building blocks and/or materials. A player may choose a building block from the tool bar and position it over an object and/or ledge on the background video image. Object recognition and/or edge detection of the background video imagery may be performed to gather information regarding the foundation upon which the player is building the virtual tower. Stability of the virtual tower may be determined based on the dimensions and orientation of the recognized objects in the video background.

In another example, an augmented thief game may be designed. For example a player may be required to steal a virtual object placed in a real world background without being noticed by virtual sentinels. The player may sneak towards the object and 'grab' it while the guards are not watching. The guards can only see the player while the player is moving.

The position of the player may be a focusing bracket of the camera the player may move through the real world background by moving the mobile terminal to change the camera view, e.g. the real world background. Grabbing the object may, for example be facilitated by positioning the focusing brackets over the object to be grabbed and pressing a button on the mobile device.

Sentinels may appear and/or may be shown to face the graphical object representing the player when motion may be detected, e.g. motion may be detected with camera navigation and/or motion tracking. The sentinels may, for example start shooting at the player when movement may be detected.

For multi-playing, two players may collaborate or compete and/or one player may be the thief while the other player may be the guard. The target and sentinel may appear in the same locations for both users. The players may collaborate or compete, for example, both players may advance towards the target simultaneously, e.g. a flag, when the sentinels turn to one, the other can advance until one of the players reach the flag. In one example, a counterpart player may launch virtual objects to an opponent.

According to other embodiments of the present invention edge detection of the video and/or background imagery may be implemented to improve synchronization between the background video imagery and the graphical objects and enhance the gaming experience. For example, a game may be designed where little groups of creatures may be placed on a ledge in the real world, e.g. background video imagery. The creatures continuously advance until they reach an obstacle, then turn and advance in the other direction. A target gate is placed automatically somewhere in the defined game screen. The player has to use objects seen in the video imagery to provide a passage way for the creatures to move toward the gate, e.g. manipulate the camera view so that the creatures will have a ledge and/or a platform on the background screen to walk on. In one example, the creatures may only advance when they can be viewed in the field of view of the camera. In addition, players may choose virtual objects from a tool box such as virtual ledges, bridges, stairs and other objects to assist in paving a path for the creatures to move toward the gate and to prevent them from falling off a path. Mutli-playing may be implemented where players collaborate with other counter players that see the same creatures in the same approximate locations in the environment. Both users see the same creature, e.g. lemming, and/or creatures in the same environment. They can compete, for example by trying to get their lemming to the gate first.

According to some embodiments of the present invention, multi-players may play with a background game screen that is a predefined video sequence and/or captured image stream. In other embodiments of the present invention, multi-players may use real-time video images as a background game screen. Real-time video images may offer a more exciting gaming experience where players may incorporate the game into their real world environment.

According to an exemplary embodiment of the present invention, applications described herein may be developed in C++ using, for example, object oriented methodology. For example, applications may rely on STRI's software infrastructure modules and CaMotion library which provides motion detection capabilities using the mobile terminal's camera, e.g. the phone camera. The software may be changeable to support other/new platform attributes, such as screen size, horizontal user face and/or other attributes. In some embodiments of the present invention, networking between the terminals may be achieved using Bluetooth SPP Protocol.

According to some embodiments of the present invention, the application may be designed/developed using Model, View and Control (MVC) methodology for example, to separate data (model) and user interface (view) concerns, so that changes to the user interface do not impact the data handling, and that the data can be reorganized without changing the user interface.

Figure 9:
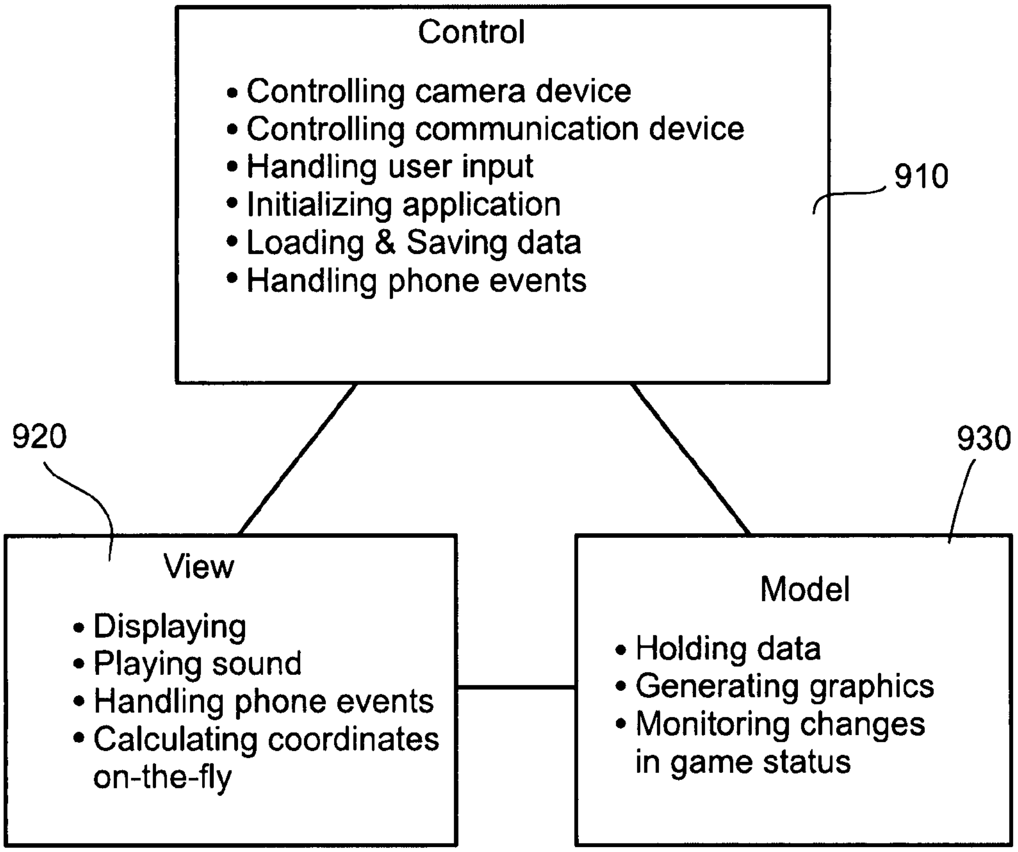
FIG. 9 is an exemplary illustration model-view-control design according to an exemplary embodiment of the present invention.

Reference is now made to FIG. 9 showing a model-view-control design according to an exemplary embodiment of the present invention. According to embodiments of the present invention, the model layer 930 may be responsible for holding all the application data, generating the different graphic data and their parameters in the game start, e.g. bubbles and power ups, and checking for status and/or data changes in the game.

Application data may include for example, in the balloon shooting game, one or more of game status, user and competitor scores, bubbles parameters, power up status, current level, ammunition status, user world dimensions. Status checking may include checking if the player missed or shot a balloon and the application response to that, and checking if the game should be over. In embodiments of the present invention, graphics generation is performed in world coordinate systems and is not contingent on the view resolution of the terminal devices.

According to embodiments of the present invention, the control layer 910 may be responsible for initiating the application, loading and saving user data, handling phone events and user input signals, and controlling camera, e.g. initializing, starting, and stopping the camera, and communication device. User data may include one or more game configurations, e.g. high score and saved levels. During phone events, the control layer may stop and re-run application at the termination of the phone event. The control layer may be responsible for sending and receiving data from other terminal devices, e.g. using Bluetooth communication, and transmitting data to model layer. User input signals may include striking of keys and/or user movement using camera navigation, e.g. CaMotion algorithm.

According to embodiments of the present invention, the view layer 920 may be responsible for displaying graphical user interface components in the application, e.g. screens, creatures, power ups and user data, playing sounds related to game events, and calculating the coordinates on-the-fly by the mobile screen definitions. Other suitable responsibilities may be defined to each of the three layers.

According to other embodiments of the present invention, applications other than gaming applications and/or not specific to gaming applications may be implemented.

According to one embodiment of the present invention, an object of the present invention is to provide wireless mobile method and system including a camera that enable multiple users to share data synchronized and/or linked with real time images captured by a mobile terminal of the mobile system. In one example a user may send data to a receiving user, e.g. graphic data, linked to a specific location and/or object in a video stream. The receiving user may pan an area to locate the specific location and/or object in a video stream. Upon reaching the designated location, the may be displayed. Synchronization between users may be based on camera motion tracking and/or other motion tracking, and image and/or object recognition.

For example, a user may decide to link and/or anchor a virtual, textual, and/or graphical object to a specific real-world object, e.g. an object captured by the camera and/or a specific object displayed in the background. Image recognition may be used to define and/or recognize the real-world object. The user may then send relevant data, data identifying the specific real-world object, to other users and those users when panning the environment with their camera will find the virtual object. For example, a first user may tag a textual message, a person's name, on the face of person A in the room and may send data, e.g. defining the virtual object and where it should be placed in the real world, to a second user with counterpart mobile terminal, e.g. a second user in the room. The second user may pan the room until person A may be detected and recognized. Upon recognition, the textual message may appear in the vicinity of the recognized person informing the second user of person's A name.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

As described above, the wireless gaming method and wireless gaming-enabled mobile terminal of the present invention enable establishing an ad hoc network with another mobile terminal using short range wireless communication technique, whereby multiple players can participate in a game with their mobile terminals, e.g. mobile phones.

Also, the wireless gaming method and wireless-gaming enabled-mobile terminal of the present invention use an image taken, in real time, by a camera module of the mobile terminal as a background image of a game screen, resulting in attracting a users interest.

It should be further understood that the individual features described hereinabove can be combined in all possible combinations and sub-combinations to produce exemplary embodiments of the invention. The examples given above are exemplary in nature and are not intended to limit the scope of the invention which is defined solely by the following claims.

The terms "include", "comprise" and "have" and their conjugates as used herein mean "including but not necessarily limited to".

The invention claimed is:

1. A wireless gaming method for a mobile terminal having a camera, comprising:

inviting at least one counterpart terminal on a short range wireless communication network by transmitting a multi-player gaming mode request message, when a multi-player gaming mode for a game is activated;

synchronizing game data with the counterpart terminal transmitting an acknowledge message, when an acknowledge message is received in response to the multi-player gaming mode request message;

generating a game screen with a real image taken by the camera as a background image after the game is synchronized;

starting the game with the generated game screen; and exchanging game data generated during the game with the at least one counterpart terminal, wherein said exchanging game data with the at least one counterpart terminal comprises correcting drifts due to errors accumulated in camera navigation between players, said correcting drifts being performed by recalculating the mobile terminal positions according to graphic data anchored to references in said background image.

2. The wireless gaming method of claim 1, wherein the inviting comprises:

discovering terminals on the short range wireless communication network;

listing at least one discovered terminal on a display; and transmitting the multi-player gaming mode request message to the at least one counterpart terminal, when a terminal is selected as the at least one counterpart terminal by a key input.

3. The wireless gaming method of claim 2, wherein the short range wireless communication network is an ad hoc network.

4. The wireless gaming method of claim 1, wherein the generating comprises:

converting the real image input from the camera into video data; and synthesizing the video data and graphic data of the game data to generate the game screen.

5. The wireless gaming method of claim 1, further comprising performing a motion tracking on the basis of the real image taken by the camera for matching a movement of graphic data with the background image.

6. The wireless gaming method of claim 1, further comprising synchronizing the game data with the real image.

7. The wireless gaming method of claim 6, wherein the synchronizing is to provide location persistency between the game data and the real image.

8. The wireless gaming method of claim 1, further comprising synchronizing the background image of the terminal with the background image of the at least one counterpart terminal.

9. The wireless gaming method of claim 1, further comprising detecting relative position and orientation between the terminal and the at least one counterpart terminal.

10. The wireless gaming method of claim 1, further comprising tracking motion between the terminal and the at least one counterpart terminal.

11. The wireless gaming method of claim 1 comprising navigating through an area of the game screen by changing a field of view of the camera.

12. The wireless gaming method of claim 1, wherein said exchanging game data with the at least one counterpart terminal comprises displaying a field of view of the at least one counterpart terminal on the mobile terminal game screen.

13. The wireless gaming method of claim 1, wherein said exchanging game data with the at least one counterpart terminal comprises displaying achievements of the at least one counterpart terminal on said mobile terminal game screen.

14. A wireless gaming-enabled mobile terminal comprising:

a camera unit having a circuit configured for taking an image;

a video processing unit having a circuit configured for processing the image;

an input unit having a circuit configured for receiving a user input;

a control unit having a circuit configured for generating a game screen by combining a video data output from the video processing unit and graphic data of a game, said control unit circuit further configured for exchanging game data generated during a game with at least one counterpart terminal, wherein said exchanging game data with the at least one counterpart terminal comprises correcting drifts due to errors accumulated in camera navigation between players, said correcting drifts being performed by recalculating the mobile terminal positions according to graphic data anchored to references in a background image;

a display unit having a circuit configured for displaying the game screen;

a short range wireless communication unit having a circuit configured for establishing a game network with the at least one other terminal in a multi-player gaming mode; and a storage unit having a circuit configured for storing game data including the graphic data.

15. The wireless gaming-enabled mobile terminal of claim 14, wherein the game network is an ad hoc network.

16. The wireless gaming-enabled mobile terminal of claim 14, wherein the control unit discovers, if a multi-player gaming mode is selected, terminals on the game network and displays discovered terminals on the display unit.

17. The wireless gaming-enabled mobile terminal of claim 16, wherein the control unit transmits, if a terminal is selected as a counterpart terminal, a multi-player gaming mode request message to the selected counterpart terminal.

18. The wireless gaming-enabled mobile terminal of claim 17, wherein the control unit performs, if an acknowledgement message is received in response to the multi-player gaming mode request message, synchronization with the selected counterpart terminal.

19. The wireless gaming-enabled mobile terminal of claim 17, wherein the control unit exchanges game data generated during the game with the selected counterpart terminal in real time through the short range wireless communication unit.

20. The wireless gaming-enabled mobile terminal of claim 18, wherein the control unit generates the game screen by combining the image taken by the camera unit and graphic data synchronized with the selected counterpart terminal.

21. The wireless gaming-enabled mobile terminal of claim 14, wherein the control unit performs motion tracking on the basis of the image taken by the camera unit.

22. The wireless gaming-enabled mobile terminal of claim 14, wherein the graphic data includes a virtual animal trapped in a balloon.

23. The wireless gaming-enabled mobile terminal of claim 14, wherein the graphic data includes a text box anchored to an object in the video data output.

24. The wireless gaming-enabled mobile terminal of claim 14, wherein the graphic data includes building blocks to be positioned on a foundation defined by an object in the video data output.

* * * * *